(12) United States Patent
Vanhalle (10) Patent No.: US 9,558,184 B1
(45) Date of Patent: Jan. 31, 2017

(54) SYSTEM AND METHOD FOR KNOWLEDGE MODELING

(76) Inventor: Jean-Michel Vanhalle, Liege (BE)

( * ) Notice: Subject to any disclaimer, the term of this patent is extended or adjusted under 35 U.S.C. 154(b) by 1980 days.

(21) Appl. No.: 11/689,474

(22) Filed: Mar. 21, 2007

(51) Int. Cl.
*G06F 17/30* (2006.01)

(52) U.S. Cl.
CPC ......... *G06F 17/30* (2013.01); *G06F 17/30002* (2013.01)

(58) Field of Classification Search
CPC .... G06F 11/2082; G06F 21/6218; G06F 8/24; G06F 8/30; G06F 8/71; G06F 9/443; G06F 19/12
USPC ............................ 707/104.1, 600–831, 899, 707/999.001–999.206
See application file for complete search history.

(56) References Cited

U.S. PATENT DOCUMENTS

| | | | | |
|---|---|---|---|---|
| 5,555,370 | A * | 9/1996 | Li et al. ......................... | 715/763 |
| 5,732,192 | A * | 3/1998 | Malin et al. ..................... | 703/2 |
| 5,918,232 | A * | 6/1999 | Pouschine ......... | G06F 17/30592 |
| 6,941,287 | B1 * | 9/2005 | Vaidyanathan et al. ......... | 706/12 |
| 6,976,020 | B2 * | 12/2005 | Anthony et al. | |
| 7,130,863 | B2 * | 10/2006 | Diab | |
| 7,516,052 | B2 * | 4/2009 | Hatcherson et al. ............. | 703/6 |
| 7,581,066 | B2 * | 8/2009 | Marwinski et al. ........... | 711/129 |
| 2001/0034733 | A1 * | 10/2001 | Prompt et al. ................. | 707/102 |
| 2004/0006566 | A1 * | 1/2004 | Taylor et al. ................. | 707/100 |
| 2004/0181548 | A1 * | 9/2004 | Thomas ............ | G06F 17/30265 |
| 2004/0181773 | A1 * | 9/2004 | Mortensen et al. .......... | 717/101 |
| 2005/0044530 | A1 * | 2/2005 | Novik ............................ | 717/122 |
| 2005/0049988 | A1 * | 3/2005 | Dahlquist .......... | G05B 23/0278 706/46 |
| 2006/0047720 | A1 * | 3/2006 | Kulkarni et al. ............. | 707/204 |
| 2006/0048048 | A1 * | 3/2006 | Welcker et al. .............. | 715/513 |
| 2006/0070005 | A1 * | 3/2006 | Gilbert et al. ................ | 715/763 |
| 2006/0080338 | A1 * | 4/2006 | Seubert et al. ............... | 707/100 |
| 2006/0085336 | A1 * | 4/2006 | Seubert et al. .................. | 705/40 |
| 2006/0085450 | A1 * | 4/2006 | Seubert et al. ............... | 707/100 |
| 2006/0168558 | A1 * | 7/2006 | de Seabra e Melo et al. ............................. | 717/105 |
| 2006/0195453 | A1 * | 8/2006 | Plaisted et al. ................. | 707/10 |
| 2007/0073784 | A1 * | 3/2007 | McVeigh et al. ............. | 707/200 |
| 2007/0112714 | A1 * | 5/2007 | Fairweather .................... | 706/46 |
| 2008/0046421 | A1 * | 2/2008 | Bhatia et al. ..................... | 707/5 |
| 2008/0104032 | A1 * | 5/2008 | Sarkar ................................ | 707/3 |
| 2008/0120129 | A1 * | 5/2008 | Seubert et al. .................... | 705/1 |
| 2008/0133303 | A1 * | 6/2008 | Singh et al. ...................... | 705/8 |
| 2008/0163088 | A1 * | 7/2008 | Pradhan et al. .............. | 715/764 |

* cited by examiner

*Primary Examiner* — Angelica Ruiz
(74) *Attorney, Agent, or Firm* — Pearne & Gordon LLP (57) ABSTRACT

A computer-integratable global knowledge modeling system comprising electronic means for expressing a plurality of entity representations interconnected by relations is described, wherein the entity representations, comprising modeling base elements and rules, are organized according to a fine-grained hierarchical or fractal structure, the relations between entity representations being highly detailed; a plurality of variants, representing each a particular point of view, are associated to at least a part of an entity representation in order to customize the corresponding entity representation; and the knowledge modeling system is usable in an adaptive computer-executable artifact.

12 Claims, 8 Drawing Sheets

SYSTEM AND METHOD FOR KNOWLEDGE MODELING

BACKGROUND

1. Technical Field

The present invention relates to a system and a method to allow one, two or more parties to model and share knowledge, in particular structured knowledge along with the possibility to use whole or part of this model in or with a computer executable artifact.

2. Description of Related Art

Open source projects reduce the cost of development but the integration work is still important as initiatives in this area are quite scarce, are using different languages, different coding conventions, different technical infrastructures and are focused on code rather than high-level knowledge models.

From a global perspective, there is a lot of work duplication in the way one builds administrative, commercial, financial and generally most structured data-oriented application. For instance the business logic of a specific income tax exemption is probably coded in the tax administration software itself of course and in dozens of commercial software used by taxpayers. Moreover it may be coded in different implementation languages.

From a global perspective, there is also a lot of structured data duplication between privately or publicly held databases or file systems. Synchronization between those data repositories is mostly nonexistent. This usually requires a lot of efforts, time and energy waste to maintain up-to-date data, build appropriate and dedicated replication mechanisms when possible. There is however a growing need of connecting systems.

As far as structured data are concerned, connectivity between people, companies and administration is quite limited. Creation of web services between parties is still cumbersome, of limited usability and is relatively expensive. The methods to define mapping between data show low reusability.

The existing ontologies, taxonomies or knowledge systems are often limited to static knowledge description or have not shown sufficient versatility and ease of use to allow large-scale usage or integration in information systems.

Customizing knowledge in the current modeling methods and systems is not possible or very limited. Therefore the possibility to share and reuse knowledge is greatly constrained.

Automation of software production requires strong ability to integrate usage data, e.g., the way one is going to use the knowledge model, the data defined or derived from this knowledge model. This usage data, beside general knowledge, is a key element to be able to automate parts of a software design.

Automation of software production requires also a set of ontological information that is usually missing from the usual models used to produce software because it is usually too costly to formalize this information or interact with ontological systems.

Mainstream Modeling Methods are based on a single point of view on a business domain. Thus if one needs to connect the information system built from the model to another existing information system, one is usually forced to use other techniques or methods to define the collaboration between the two systems, through data mapping methods, services or API definition.

Let us take a comparison for clarifying this. Let us say that Juan is a native Spanish speaker. Juan is able to communicate effectively with any member of the Spanish speaking community, and express ideas, opinions, exchange information, etc., with a set of words that are well-known for the members of his linguistic community. If Juan has to talk to Natacha, a Russian speaker, he will have to buy a Spanish-Russian dictionary. And if he has to talk to a Japanese speaker, he will have to get a Spanish-Japanese dictionary.

Building an information system follows the same pattern. One first builds a model, e.g., a kind of community language, and the information system through a local point of view (a company, organization, part of an organization, etc.); then one builds later the interface or the data mapping to make the system able to communicate with another one.

However a major difference between the human communities and the information system models is in the number and the size of the communities: a linguistic community may have millions of members and there are about 2,000 active languages around the world. On the other hand knowledge models are usually built for a company or a company department, so there are millions of them, and they are used by people in the hundreds or in the thousands through an information system. Therefore the communication tools are far more important in the case of information system models. Establishing a communication protocol between information systems is a specific task, e.g., it usually implies a dedicated work for each couple of information systems. Note that in some cases an industry-wide initiative has led, usually after a long process, to a common communication protocol; the data mapping task relates then to the mapping from an internal model to the industry standard. And as these information systems have been built from separate models, the cost of the definition of the communication protocol is very high.

Let us explain the "data vs. metadata" concept. Historically the design of large software has followed a layer pattern. Code and tools for building, as well as managing that code, are built around a specific layer. For example, in a data-oriented application, one of these layers can be a database and tools exist to manage the design and the administration of this database layer.

One is able today to change seamlessly any data in a database-oriented application. Changing the schema of this database, that is the metadata, is a part of the software engineering discipline and usually requires another tool, managed by technical people. To cope with the lack of flexibility of this approach one has created data structures where part of their definition, part of the metadata, is left to the user as a customizable item. Off-the-shelf software uses this technique to allow some specific customization for their customers.

In addition to increased complexity, this usually leads to a performance loss as this translates technically into an additional indirection level. The same holds for business rules.

As business is ever changing and corporations need to react more quickly, better change management techniques are needed. However tools to manage metadata at different layers are already in place. These tools are thus now extending their functionality to be able to dialog with other tools. This has several drawbacks:

metadata are scattered in several tools so that discrepancies are frequent;

metadata are mainly handled by technical people, separated from the business department where the data themselves are created and used. Thus the change process remains heavy.

To carry on with our comparison, Juan may extend the knowledge of his mother tongue by using a Spanish dictionary with word definitions, synonyms, etc. In a dictionary, words are defined using other simpler words. Those simpler words have different roles: in some use cases they describe something, in other they help to describe other words. The same holds in information systems: what is considered to be metadata from a point of view is data from another point of view.

Since the nineties, an effort has been undertaken to unify and standardize the semantics and notation in object-oriented modeling languages. This standard is known under the name UML (Unified Modeling Language). UML is a standard language for specifying, visualizing, constructing and documenting the artifacts of software systems as well as business modeling. The industry looks for techniques to automate the production of software, to improve quality and reduce cost and time-to-market. Businesses also seek techniques to manage the complexity of systems as they increase in scope and scale. In particular, there is a need to solve recurring architectural problems. Additionally the development of the internet, while making some things simpler has exacerbated these architectural problems. UML was designed to respond to these needs.

A UML model is based on class diagrams. A class is an entity of a given system which encapsulates implementation of business functionality. A class is a named representation of objects or entities which comprise attributes (properties, features) and methods (what the objects do). In another approach a class has a name and responsibilities. Classes form the main building blocks of an object-oriented application. Objects are associated with or related to other objects. Associations are modeled as bidirectional lines connecting the two classes whose instances are involved in the relationship. Other useful relationships between classes have been defined: multiplicity, directed association (unidirectional), aggregation, composition, inheritance/generalization, realization, etc. Particularly inheritance is an interesting mechanism taking advantage of similarities often existing between different classes and permitting not to write the same code repeatedly.

In UML, a "method" or "function" is attached to a "class". Software engineers may often hesitate between encapsulation in a class or another one (or to create a specific class for this purpose). The semantics of the method, dependencies between classes are decision factors. Changes may affect negatively past design decisions and force the software engineer to redesign part of his software. Design pattern have been created to try to cope with this issue by providing flexible design for aspects that are supposedly subject to change.

SUMMARY OF CERTAIN EMBODIMENTS

Under the scope of the present invention are methods and apparatus, including computer program products to structure and produce a knowledge model. Embodiments of the invention relate to the structure of a knowledge global model as well as to the method to produce such a knowledge model.

The model according to certain embodiments has a fine-grained fractal structure and the relations between the components of the model are highly detailed. Variants can be created on each element to hide, reduce, customize or extend elements in the model according to one's personal needs or group of people's points of view on the problem's domain.

This approach reduces the overall time required to integrate the created knowledge model, or part of it, in an information system or use the model in an adaptive computer executable artifact or to produce an executable artifact based on the model. A feature is to be able to use different parts of the knowledge model in different information systems and reduce the cost of communication protocol definition between those systems.

This modeling approach is suitable with a process in which:
  the model is directly interpreted within a generic program to produce the modeled behavior,
  the model is used to automatically build a program to be compiled, this program producing the modeled behavior, or
  the model is used within a mixing of both approaches, where part of the model is interpreted, part of the model is built as a program.

More precisely, one embodiment relates to a computer-integratable global knowledge modeling system comprising electronic means for expressing a plurality of entity representations interconnected by relations, wherein
  said entity representation, comprising modeling base elements and rules, are organized according to a fine-grained hierarchical or fractal structure, said relations between entity representations being highly detailed;
  a plurality of variants, representing each a particular point of view, are associated to at least part of an entity representation in order to customize the corresponding entity representation, while keeping unchanged the general meaning of said entity;
  said knowledge modeling system is usable in an adaptive computer-executable artifact.

A further embodiment is a method for computer-assisted generation of a global knowledge modeling system comprising a plurality of entity representations interconnected by relations, said method comprising:
  organizing said entity representations according to a fine-grained hierarchical or fractal structure, with a high degree of detail of the relations between entity representations;
  associating a plurality of variants, representing a particular point of view, to at least a part of an entity representation in order to customize the corresponding entity representation and keeping the general meaning of said entity;
  using said knowledge modeling system in an adaptive computer-executable artifact.

A further embodiment relates to a computer-readable medium storing a set of computer-executable instructions for performing the method above.

A further embodiment also relates to a computer-integratable fractal knowledge modeling system comprising a plurality of entity representations interconnected by entity relations in a related knowledge model, wherein:
  each said entity representation is identified by a name or an identifier,
  said entity representations and said entity relations are integrated recursively,
  one or more of said entity representations can be associated into one or more execution contexts in which actions or functions can take place and are defined, said execution contexts being the base elements necessary or useful to perform said actions or functions, said execution contexts being able to be integrated recursively;

variants can be defined in the knowledge model on any element of said knowledge model, said variants being used to customize said model knowledge element by changing one or several characteristics of said element, including a data or metadata character of said element.

A further embodiment relates to a method for digitally modeling knowledge, comprising:
(1) defining a plurality of seed modeling cells, and storing said modeling cells in a computer datastore;
(2) defining a first plurality of modeling cells as a variation and/or an extension and/or an aggregation of said seed modeling cells, and storing said first plurality of modeling cells in a first plurality of other computer datastores;
(3) defining a second plurality of modeling cells as a variation and/or an extension and/or an aggregation of the modeling cells of act (2), and storing said second plurality of modeling cells in a second plurality of other computer datastores;
(4) repeating the act (3) as necessary.

A further embodiment relates to a method for sharing and reusing metadata, involving multiple users through a network or the internet, wherein a first user defines a set of metadata and makes it available to other users for usage and a second user defines a variation or variant of said set of metadata of said first user, said metadata being referenced by the variation, or creates a modified copy of said set of metadata of said first user, said variation or said modified copy being considered as metadata by other users.

A further embodiment relates to a method for digitally modeling knowledge, involving multiple users through a network or the internet, comprising:
(1) a first user defines a plurality of seed modeling cells, and stores said modeling cells in a datastore;
(2) a second user defines a first plurality of modeling cells as a variation and/or an extension and/or an aggregation of said seed modeling cells, and stores said modeling cells in a first plurality of other datastores;
(3) a third user defines a second plurality of modeling cells as a variation and/or an extension and/or an aggregation of the modeling cells of act (2), and stores said modeling cells in a second plurality of other datastores;
(4) additional users repeat the act (3) as necessary.

A further embodiment relates to a knowledge management tool comprising a data module for storing modeling cells, an edition module for creating and editing modeling cells stored in said data module.

A further embodiment relates to a computer program product, physically stored on a computer-readable medium, said computer program product comprising instructions operable to cause a programmable processor to:
  receive one or more data items of a knowledge system and store said data items in a first data store;
  connect to other data stores locally or through a network;
  search for existing data items on the basis of criteria, selected from the group consisting of identifier, name and characteristics, in said first data store or said other data stores;
  receive new data items or modifications of existing data items and store the latter in a local data store.

A further embodiment relates to a computer-readable medium storing a set of computer-executable instructions operable to cause a programmable processor to execute one or more of the following actions:
  create a knowledge system;
  receive one or more modeling data items for this knowledge system;
  connect to other knowledge system locally or through a network;
  search for existing data items of said knowledge system based on criteria selected in the group consisting of identifier, name and characteristics;
  receive new data items or modification of existing data items.

A further embodiment relates to a data structure used for the handling of data items as elements of the fractal knowledge or modeling system described above on a computer-readable medium.

A further embodiment relates to a computer-readable medium tangibly storing a computer program product comprising different software modules or components having computer-executable instructions operable to cause a programmable processor to:
  display on a monitor a set of data items of a knowledge system for a user inspection, modification or usage;
  allow said user to create data items;
  connect through a network to a plurality of other knowledge systems;
  retrieve from said other knowledge systems other data items from a plurality of users;
  allow said user to create a variation or variant of said other data items;
  allow said user to create a relation between said data items, between said other data items or between said other data item and said data items.

Further embodiments are described in the appended Claims.

DETAILED DESCRIPTION OF CERTAIN EMBODIMENTS

A. General Description

Figure 1:
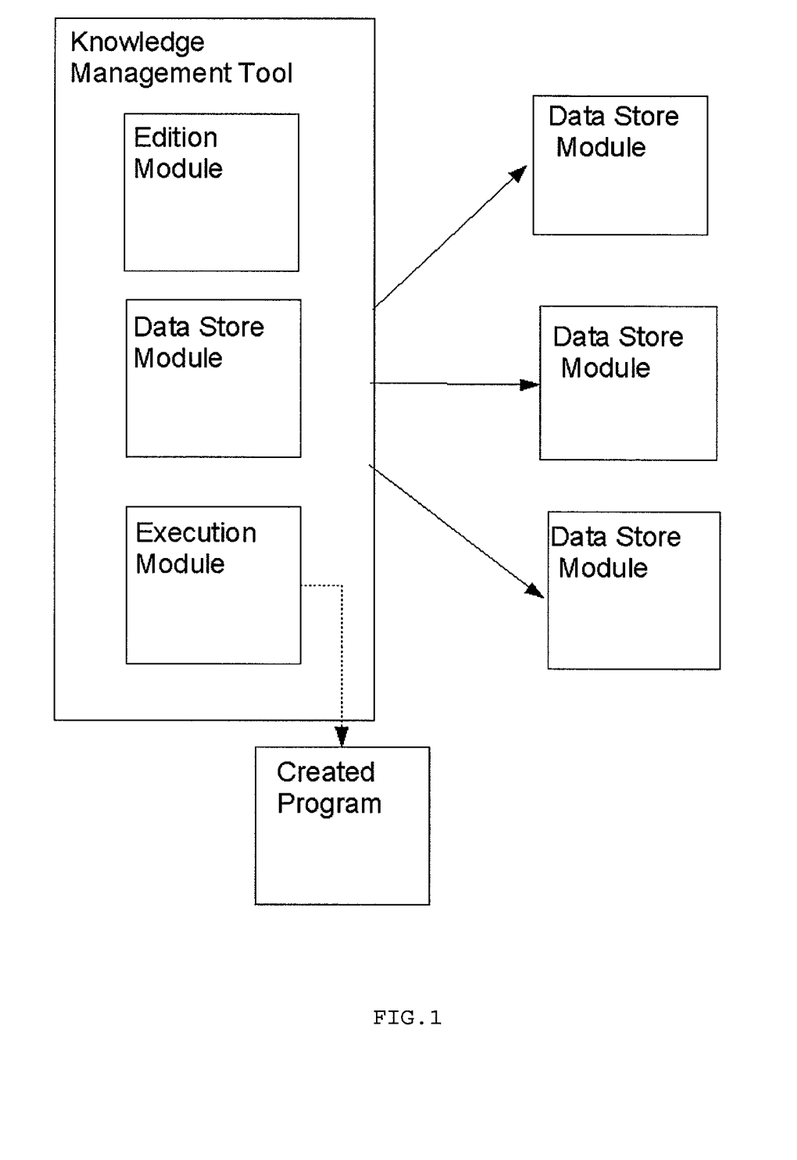
FIG. 1 represents diagrammatically an embodiment of one example of an apparatus for knowledge modeling.

As shown in FIG. 1, a Knowledge and Modeling System can be created with the objective of setting up a computer program based on only a part of the knowledge model. A Knowledge Management Tool contains a Data Store Module, an Edition Module and an Execution Module. The Knowledge Management Tool is able to connect to external Data Store Modules, possibly through a network or the internet. The Data Store Module is responsible for storing and retrieving data items of the knowledge model. The data items of this knowledge system have specific characteristics described in the next section. Data items of this knowledge system may reference to data items in external Data Store Modules. The Edition Module offers the user a display of data items of the internal data store or an external data store and the tools to edit data items or create new data items. The Execution Module transforms a selected part of the knowledge model to a program or interprets a selected part of the knowledge model to produce the modeled behavior.

The data items are based on a fractal-like structure. A fractal is defined as a shape that is recursively constructed or self-similar, e.g., a shape that appears similar at all scales. A fractal has a basic structure or shape that repeats itself to form higher-level complex structures.

In this Knowledge and Modeling System the basic data structure is a data item called Modeling Cell. The Modeling Cell has a set of constituents and properties. Several Modeling Cells can be aggregated to form a higher-level Modeling Cell. Aggregation can thus be applied iteratively to create complex Modeling Cells.

A.1 Functional Properties of Modeling Cells

A Modeling Cell is identified through a "name" or an identifier.

A Modeling Cell may contain Execution Contexts; an Execution Context is one or a group of several Modeling Cells used as the basis data for the execution of an action. The action is described in pseudocode or scripting language in the Execution Context.

A Modeling Cell can contain relations between a number of Modeling Cells; relations can be used to represent body-parts relations, time relation, position relation, affiliation, role, arity, generalization, abstraction, causal relation, etc., the list being not limited.

A Modeling Cell may contain customization of other Modeling Cells: a customization is a variation of a Modeling Cell. These customizations are called Variants. In a Variant any properties of the original Modeling Cell can be changed, such as name, relations, execution contexts, actions; any property can be added or removed. A reference to the original Modeling Cell is maintained, or a copy is made without reference to the original.

An Execution Context is a set of Modeling Cells, wherein actions can take place. It represents the base data available for the execution of the defined action(s). These base data are also the starting point for reaching out other data through a reference mechanism. Execution Context allows a direct modeling of the situation or the circumstances of an action.

An Execution Context Variant defines a variation on Execution Context where the characteristics can be changed (characteristics include also the list of Modeling Cells, the defined Actions).

An Execution Context may contain other Execution Context(s) or Execution Context Variant(s).

In an alternative embodiment the Modeling Cell itself is the Execution Context.

In still an alternative embodiment the Modeling Cell is instantiated on a web page or is accessed through a script or query in a web page.

A.2. Construction and Growth of a Model

The construction of a model is based on an iterative process.

Seed Modeling Cells are the elementary units used to start a knowledge model. Seed Modeling Cells are reduced Modeling Cells: simply Seed Modeling Cells do not have the possibility to contain Modeling Cells or contain Variants.

The growth of the model is possible through usage of specific relations. Those relations allow aggregation of Modeling Cells in another Modeling Cell. This also allows not to show internal details of some higher-levels Modeling Cells.

Once enough Modeling Cells have been created, most of the model growth occurs through variation of existing Modeling Cells.

A.3 Example of a Model Construction

Figure 2:
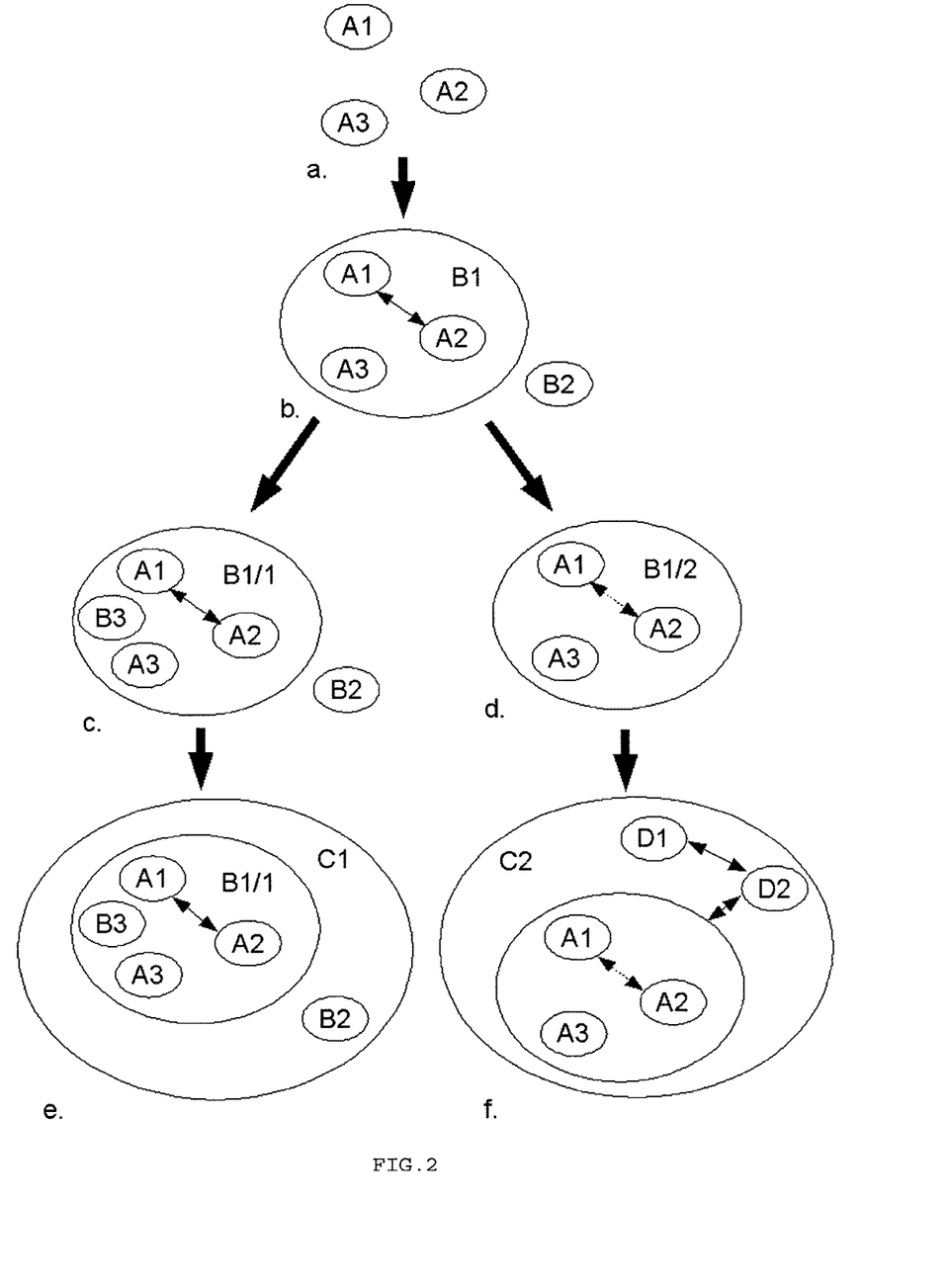
FIG. 2 depicts an example of growth of a knowledge model.

FIG. 2 depicts an example of a model growth. The model is started with three Seed Modeling Cells A1, A2, A3 (step a).

In a next step (step b), a relation is added between A1 and A2, Modeling Cell B1 is built around A1, A2, A3 (or relations are created between new cell B1 and A1, A2, A3 respectively); furthermore Modeling Cell B2 is added.

Two users are then extending the model in two different branches c-e and d-f.

In step c, user1 customizes B1 (as B1/1) with an additional cell B3. In step d, user2 customizes B1 (as B1/2) with a modified relation (dashed line) between A1 and A2 as B2 is not kept.

In step e, user1 extends his model with a Modeling Cell C1.

In step f, user2 extends his model with Modeling Cells C2, D1, D2 and relations between D1 and D2, D2 and B1/2.

The two models derived from the primitive model are able to exchange information related to the cells A1, A2, A3. There is no need to define a data mapping for the shared cells.

As the modeling structure is fractal, the FIG. 2 could also depicts a larger model where A1, A2, A3 are large Modeling Cells with hidden constituents.

A.4 A Modeling Cell may represent data or metadata

A Modeling Cell may represent data or metadata. A Modeling Cell property indicates whether it is data or not. This property may be customized in a Modeling Cell Variant. This is a distinctive feature of this modeling approach. This approach blurs the line between the manipulation of data and the manipulation of metadata. As a consequence the instantiation of a modeling cell is considered as merely another type of relation.

A.5 Rights

Visibility, access, read, update, delete and execution rights may be associated with Modeling Cells.

A.6 Execution Contexts Describes a Path to an Action

A hierarchy of Execution Contexts and Execution Context Variants can be used to describe the path to an Action. In an information system according to prior art a user may execute actions through different types of commands (command lines, menus, etc.). In the case of a graphical user interface most commands are accessed through a hierarchy of menus and submenus.

In this modeling system actions are defined in Execution Contexts. Actions may also be accessed through Execution Context Variants.

When using an information system derived from this knowledge model, the user is always in an Execution Context or an Execution Context Variant: the user has to be in the context related to an action to be able to carry out this action.

He has the possibility to trigger actions defined within the current Execution Context or Execution Context Variant. He has access to other Execution Contexts or Execution Context Variants in relation with the current one, so that he can move to these related contexts.

It means that, with appropriate names, the Execution Contexts and Execution Context Variants define a path, e.g, a suite of commands or menu items to reach a specific Execution Context.

A.7 Benefits of this Modeling Approach

This modeling approach is suitable with a process where:
  the model is directly interpreted within a generic program
    to produce the modeled behavior, the model is used to build automatically a program to be compiled, this program producing the modeled behavior, or the model is used with a mixing of both approaches, where part of the model is interpreted and part of the model is built as a program.

One considers that the usage of the model in an executable artifact or its transformation to an executable artifact has a limited cost.

Through the usage of the fractal feature, the Variant feature, the data/metadata property or their combined usage, the following possibilities are offered:

the usage of Variant tremendously increases the possibilities of a model reuse: a Variant offers a simple way to customize any knowledge model items.

a Modeling Cell considered as data may become metadata in a Variant of this Modeling Cell. This increases the possibilities of model reuse as well.

one is able to manipulate metadata in the same way as data. In a classical software engineering approach, the creation and management of metadata is mainly the role of software engineers. The global process is therefore separated into a metadata management by technical teams and a data management by operational teams. The separation between metadata and dynamic data (that is in relation with who is responsible for the maintenance) is a design time decision; therefore a change of metadata has a high cost due to the number of people involved. With this modeling approach, as the same tool can be used for the definition of data and the definition of metadata, a simpler approach to change management is possible.

one can create easily one entity with specific attributes or specific behavior: as an instantiation of a modeling cell is simply considered as another type of relation, one can also create thereby an entity with additional specific behavior or attribute. In comparison with the prior art object-oriented techniques, instantiated objects have all the same attributes and behavior of the related class.

one can create a variant of a Modeling Cell with less attributes or less behavior: in comparison, prior object-oriented techniques allow only the addition of attributes or methods to a base class.

a hierarchy of Execution Contexts and Execution Context Variants describes the path to Actions. Coupled with visibility and/or access and/or execution rights, there is no need to define additional implementation details for the definition of the user interaction with the modeled system.

additional features will become apparent from the example, the drawings and specific embodiment descriptions below.

B. Description of Modeling Elements and Modeling Rules

In a preferred embodiment, the above-defined Modeling Cell is implemented using an object approach and does contain the classes: Base Named Items, Named Items, Named Rel, Execution Contexts, Actions and their related Variants. Those are described herein below.

B.1 Elements of the Modeling

The base elements are Base Named Items, Named Items, Named Rel, Execution Contexts and Actions.

These elements can then be customized to form Variants: the purpose of the customization is to reflect one's need or "point of view", while keeping the general meaning of the item. As an example, Variants can be used to allow definition of model elements in other natural languages, point of views of different stakeholders on the same action, on the same data. Visibility, access and execution rights may be associated with all those elements.

1. BaseNamedItem

The base item of the domain representation is the BaseNamedItem. A BaseNamedItem has a name or an identifier. A BaseNamedItem can describe data or metadata. An attribute of BaseNamedItems indicates whether it is data or not.

Example of BaseNamedItems:

John Smith/Car/House1/Vehicle

A BaseNamedItem Variant defines a reference to a BaseNamedItem; the flag data/metadata may be changed as well. A BaseNamedItem Variant can be defined on another BaseNamedItem Variant.

2. NamedRel

A NamedRel establishes relations between the elements of the model.

A NamedRel can be used to represent body-parts relations, time relation, position relation, affiliation, role, arity, generalization, abstraction, causal relation, etc., the list being not limited, and contains all the information relevant for the modeling.

A NamedRel has itself a name or identifier.

A NamedRel Variant defines a Variant on a NamedRel where name and characteristics of the relation can be changed to reflect one's needs. A NamedRel Variant can be defined on another NamedRel Variant.

3. NamedItem

BaseNamedItems can be grouped to form a NamedItem. NamedItems have the basic properties of BaseNamedItems and offer the possibility to aggregate several BaseNamedItems and/or NamedItems.

One can consider a NamedItem as the named association of a set of BaseNamedItems with specific NamedRel kinds.

A NamedItem Variant defines a reference to a NamedItem where characteristics like the name or the list of constituents can be changed.

A NamedItem Variant can be defined on another NamedItem Variant.

NamedItems may represent data or metadata. A NamedItem attribute indicates whether it is data or not. This attribute may be customized in a NamedItem Variant.

This is a distinctive feature of this modeling approach. In comparison, classes and objects in UML are clearly separated. With the present modeling approach, one is able to manipulate metadata in the same way as objects. One can create one object with specific attributes or specific behavior; one can add or remove some behavior to a specific object. A NamedItem considered as metadata in one point of view may be considered as data in another one. The combination of this feature with the Variant features allows customizations that are cumbersome or impossible to obtain with the usual inheritance mechanisms in UML.

A NamedItem can contain NamedRel's between its components.

NamedItems are aggregative or hierarchical, e.g., one can group several NamedItems or BaseNamedItems with NamedRel to form other NamedItems.

4. Execution Context

An Execution Context, abbreviated as ExecContext, is a set of NamedItems and/or BaseNamedItems, wherein actions can take place. It represents the base data available for the execution of the defined action(s). These base data are also the starting point for reaching out other data through a reference mechanism.

An ExecContext has a name or an identifier.

ExecContexts are a distinctive feature of this modeling approach: in the real world most actions are situational in the sense they usually imply several objects or persons under certain circumstances. This approach indeed allows a direct modeling of the situation or the circumstances of an action.

On the contrary in the object-oriented paradigm, functions are attached to a single class and the software designer has to decide in which class to encapsulate a function. This decision is subjective as the engineer practice interferes with technical or business aspects and expectations with regard to future changes. This aspect of the object-oriented approach is therefore a barrier in the process of software production automation.

An ExecContext Variant defines a variation on ExecContext where the characteristics like the list of items in the context or the name of the ExecContext or the defined Actions can be changed.

An ExecContext Variant can be defined on another ExecContext Variant.

An ExecContext may content other ExecContexts or ExecContext Variants.

NamedItems can contain ExecContexts. An ExecContext has a name or an identifier; this name or identifier is unique within a given NamedItem.

Example

Here is a tree of NamedItems:
House (NamedItem)
  Kitchen (NamedItem)
    Cookbook (NamedItem)
      Recipe (NamedItem)
    Fridge (NamedItem)
      Food (NamedItem)
    Table (NamedItem)
    Oven (NamedItem)
    Pans (NamedItem)
    Coffee Machine (NamedItem)
    Table (NamedItem)
    Chairs (NamedItem)
  Garage (NamedItem)
Here is a tree of ExecContexts:
My Place (ExecContext)
  At Home(ExecContext)
    House (NamedItem Variant)
    Cooking (ExecContext)
      Cook (Action)
      Food (NamedItem Variant)
      Kitchen (NamedItem Variant)
      Recipe (NamedItem)
    Eat (Action)
    In Bedroom (ExecContext)
      Sleep (Action)

In this model a user will get through the ExecContexts "My Place", "At Home" to get to the "Cooking(ExecContext)" to be able to "Cook(Action)" "Food(NamedItem Variant)" using the appliances available from the "Kitchen (NamedItem Variant)": appliances include "Pans", "Oven", "Table", "Chairs", "Coffee Machine", "Fridge".

5. Action

An Action contains the pseudo-code of a given action. An Action is defined in an Execution Context.

An Action Variant defines a variation on an Action where the action name can be changed or the action description can also be customized through adaptation or selection of a part of the pseudo-code. Action itself can be defined as the aggregation of several Action Variants.

An Action Variant can be defined on another Action Variant.

The fractal nature of the model relies on the recursiveness of its elements NamedItems, ExecContexts and their respective Variants.

B.2 Example of NamedItem Variant: The Car Model

Let us take a simplified example of a so-called car and some so-called agents involved around a car. Agents are the car owner, the car dealer, the car constructor, the insurance company, etc.

Figure 3:
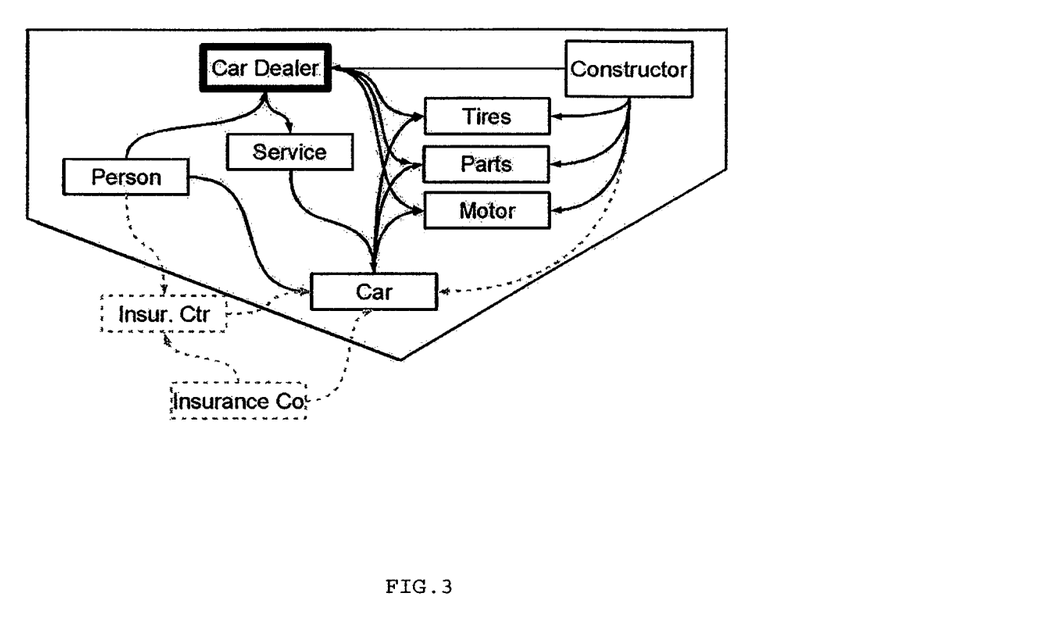
FIGS. 3 to 6 represent diagrammatically the point of view of a car dealer, a car owner, a car constructor and an insurance company, respectively, in a knowledge model applied to a car.
Figure 4:
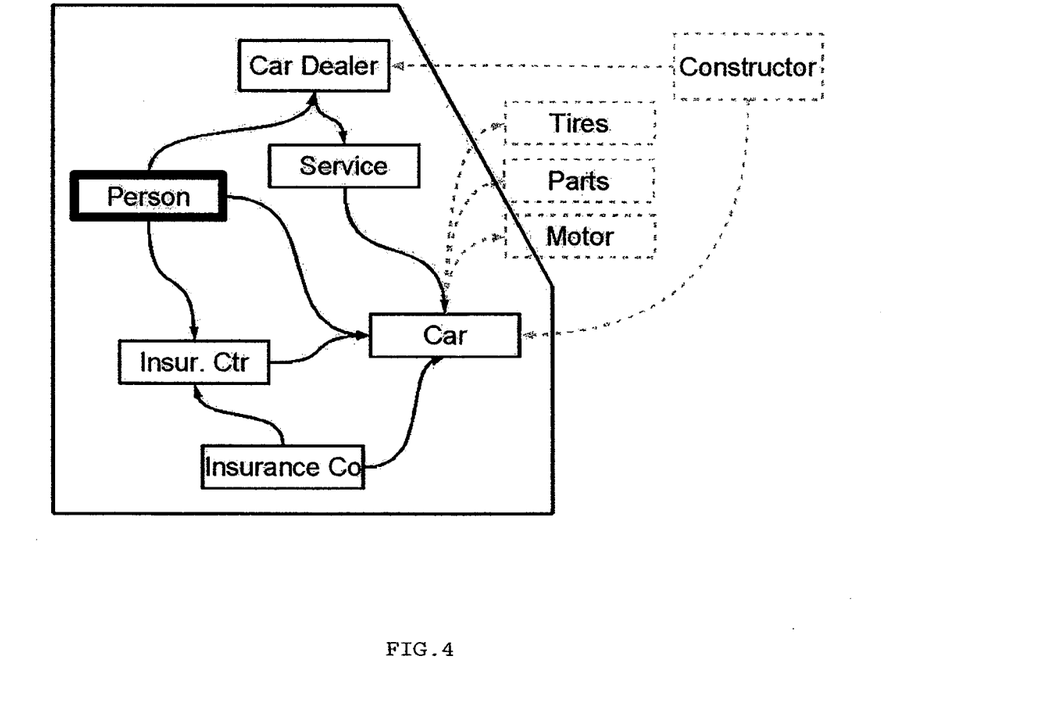
Figure 5:
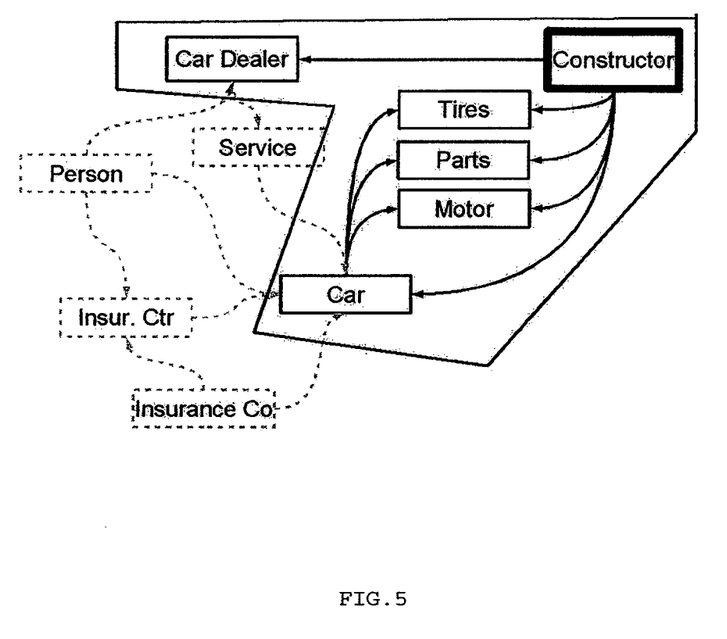
Figure 6:
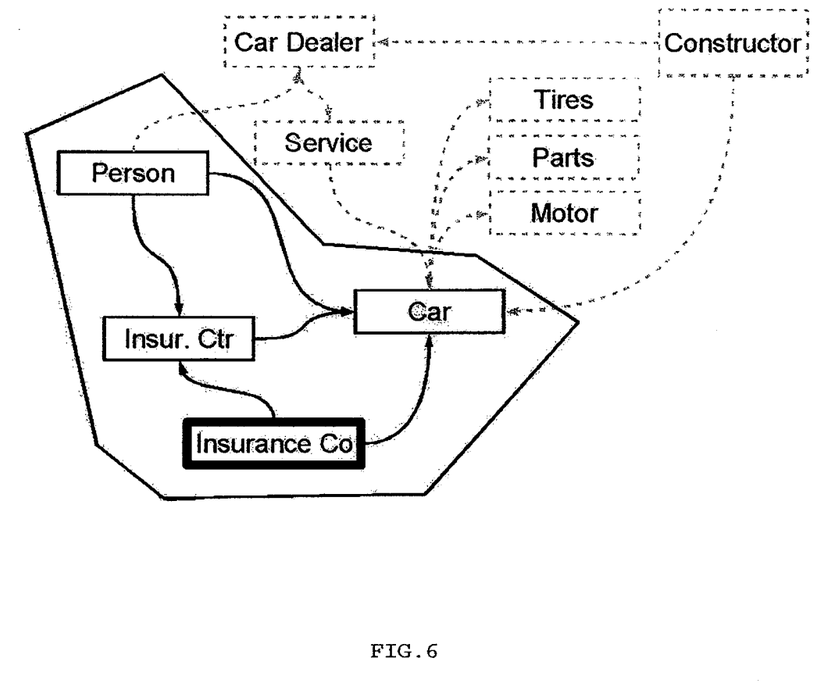
Figure 7:
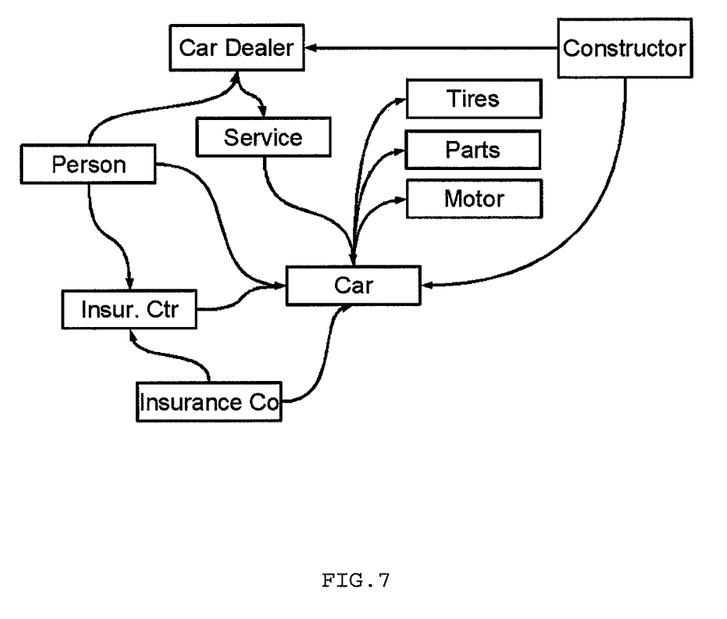
FIG. 7 represents diagrammatically an overall knowledge model applied to a car.
Figure 8:
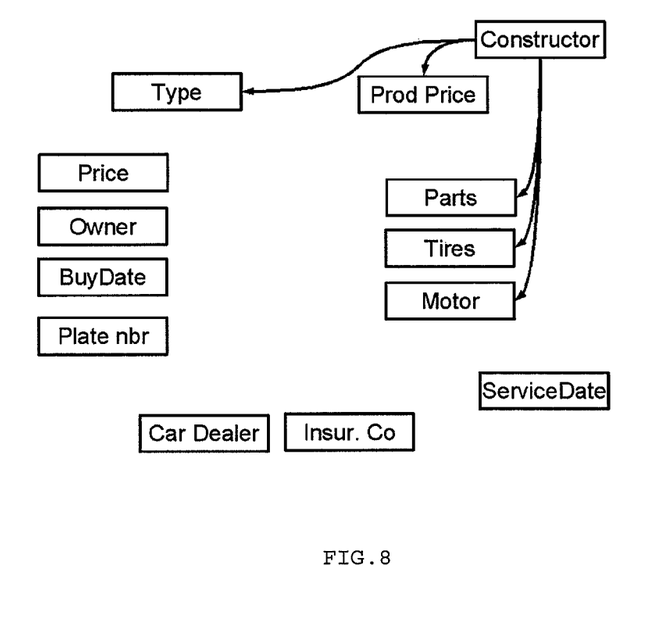
FIGS. 8 to 11 represent examples of detailed variants corresponding to different car-involved agents.
Figure 9:
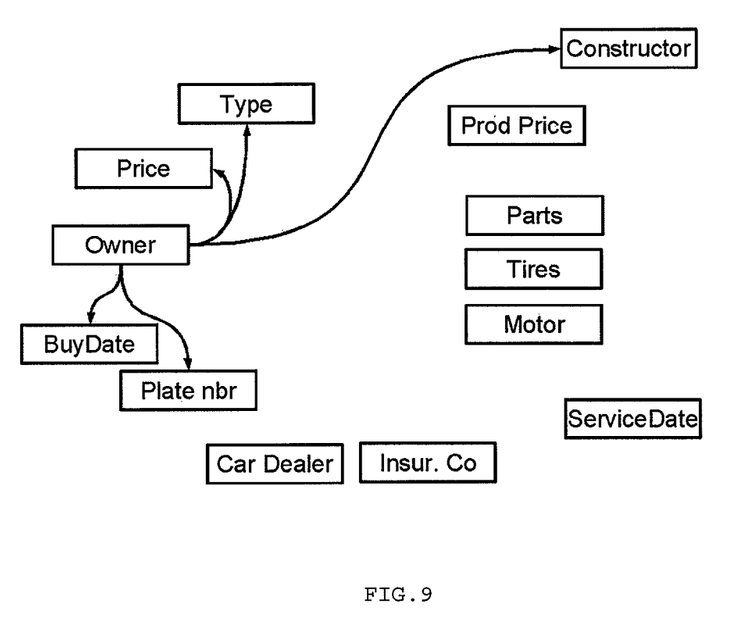
Figure 10:
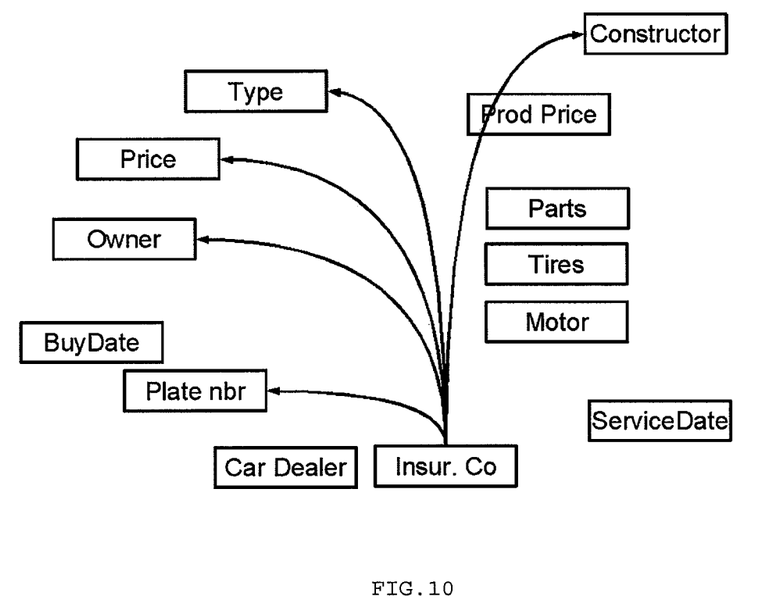
Figure 11:
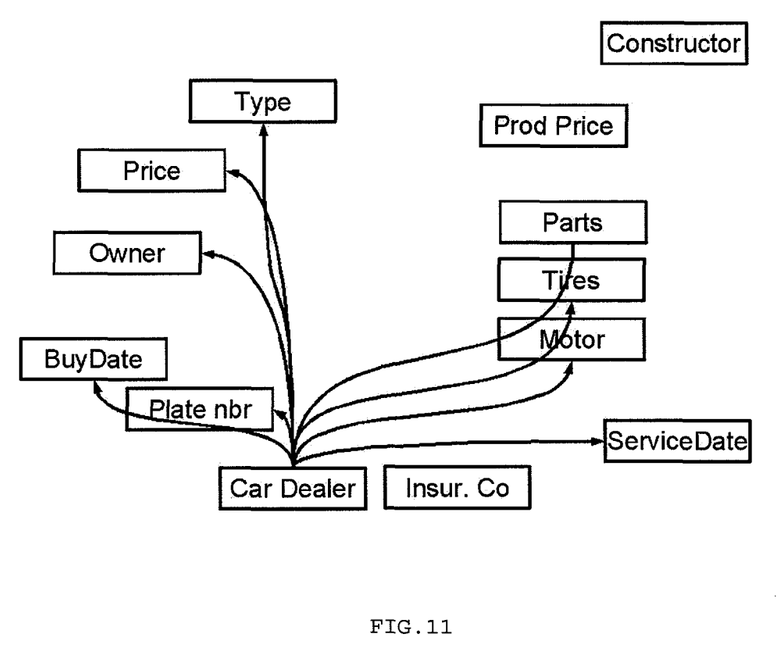

In the series of FIGS. 3 to 7, boxes refer to a NamedItem, arrows are some relations NamedRel between NamedItems. For the clarity's sake there is no detail about those relations on the figures, so that they can be understood quite easily. Grey dashed arrows and boxes relate to items not relevant to the selected point of view. For example, FIG. 6 shows the point of view of the insurance company. The insurance company in this figure is interested in a specific car, the person owning this car and the insurance contract covering the car. Tires and services for example are not useful items for the insurance company. FIG. 5 shows the point of view of the car constructor. FIG. 4 shows the point of view of the car owner. FIG. 3 shows the point of view of the car dealer, while FIG. 7 is the overall picture for this car topic.

Knowledge of this car model in FIG. 7 can be built progressively by the different agents. One sees that nearly each item in the global picture is used at least by two so-called agents. This means that some part of the knowledge formalized by one of the agents in this simplified model can be reused.

Let's move into some details about the car concept. This concept is used by each agent and the point of view is different for each agent. Each of these agents keep some data about the same car.

Sharing some of the metadata about the car concept makes it possible for interested agents to interact about a specific car, e.g., share information or perform actions.

So the following Variants on the car concept could be defined by the different agents:
- for the Insurance company: Car_InsCo_Vrt (Constructor, Type, Horsepower, PlateNumber, Price, Owner, etc.);
- for the Constructor company: Car_Constr_Vrt (Constructor, ConstructionDate, Type, Horsepower, ProductionPrice, DistributionPrice, Gear, Tires, Parts, Motor, Color, etc.);
- for the Car Owner: Car_Owner_Vrt (BuyDate, Constructor, Type, Horsepower, Gear, Tires, Motor, Color, etc.);
- for the Car Dealer: Car_Owner_Vrt (LastServiceDate, Constructor, Type, Horsepower, Gear, Tires, Motor, Color, Owner, etc.).

Those Variants are presented in Table 1 below, as well as in FIGS. 7 to 11.

B.3 Example: Action RepairCar on a Car

Main stakeholders on this action are the car owner and the car dealer (one could also include the car constructor company for providing parts). The action of repairing a car can be seen through the "lens" of both agents.

So the same action means something a little bit different whether one owns the car or whether one repairs the car.

A common Variant of this RepairCar action could be written as:

1. the car owner and car dealer convene a date appointment;
2. the car dealer gets the needed parts from the constructor;
3. the car owner gets to the garage with the car at the convened date;

4. some mechanics actually replace the broken parts,
5. while the car owner is waiting;
6. the car owner pays the repair to the car dealer, where sub actions (1,6) are common to both agents, sub actions (3,5) are specific of the car owner, sub actions (2,4) are specific of the car dealer.

So the car owner Variant (CarOwnerVariant) of this action is:
   get a appointment with the car dealer;
   get there with the car;
   wait or do something else and come back later;
   pay for the repair and get the repaired car.

The car dealer Variant (CarDealerVariant) of this action is:
   arrange an appointment with the car owner;
   get the needed parts from the constructor;
   get the car in the garage;
   commit some people to actually replace the broken parts;
   get paid for the repair;
   release the car to the car owner.

Although some Action details differ in both points of view, the communication between the two persons about the status of the Action can be done quite easily. In this case there is no need to define explicitly in the model the way the car owner and the car dealer may communicate about this repair action. If two information systems are built from this model, one for the car dealer, another one for the car owner, the communication protocol between those systems is implicitly defined by the common elements related to the Car and the Action of the model in both Variants.

The process of building a model representation of this action can be done through a bottom-up or top-down approach:
   the owner starts with its view on this action, then the car repairman adds its own view and defines a general definition;
   one of the stakeholders (or anybody interested) creates a general definition and then views (e.g., variants) are defined for each stakeholders of the action.

B.4 Domain View and Domain View Usage

The KnowledgeBase represents the whole knowledge available in the model, e.g, the set of NamedItems, NamedRel, BaseNamedItems, ExecContexts, Actions and related Variants as defined by one or many users.

A Domain View (abbreviated as DomainView) is a whole KnowledgeBase or part of a KnowledgeBase. A DomainView represents, for a user or a group of users, a coherent set of knowledge that can be used with a DomainView Usage for the construction of a software system.

A DomainView Usage is the metrics associated with a DomainView. The metrics define the way the DomainView is going to be used by a system, a user or a group of users.

Metrics can be defined by the user or can be built from the observation or a combination of both. Metrics types include: number of objects of different types, number of updates/creations/deletes of this type of data, number and location of the usage of actions, computer characteristics, cost of data transfer, network characteristics, users, type of users, etc.

Domain View and Domain View Usage are used within a computer executable artifact to manipulate the model knowledge.

B.5 Preferred Embodiment of a Class Diagram

Figure 12:
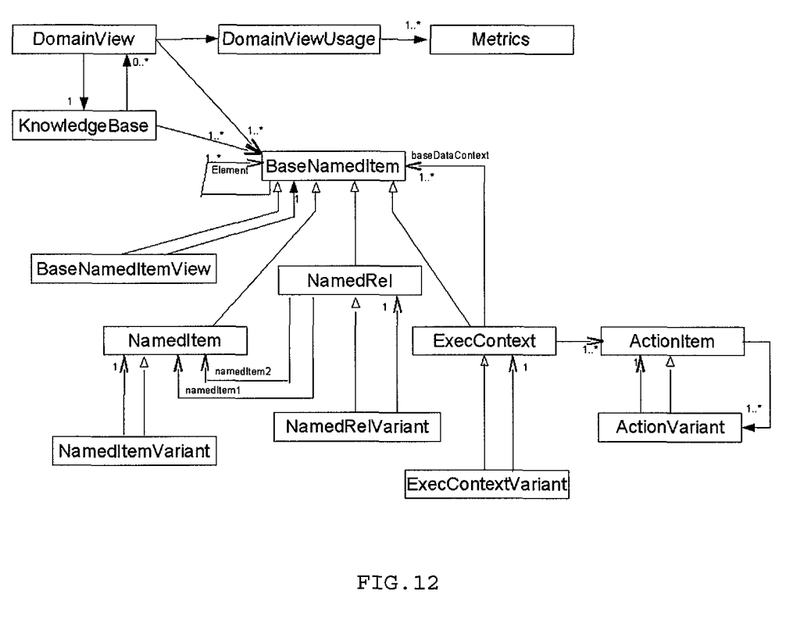
FIG. 12 represents the class diagram of a preferred embodiment.

In a preferred embodiment, the invention is realized using the class diagram depicted in FIG. 12.
   Variants are designed as the following subclasses:
   NamedItem Variant is a subclass of NamedItem;
   NamedRel Variant is a subclass of NamedRel;
   ExecContext Variant is a subclass of ExecContext;
   NamedItem Variant is a subclass of NamedItem;
   Action Variant is a subclass of Action.
   BaseNamedItem is a base class for the other elements. BaseNamedItem maintains also the list of elements for those items.

C. Collaborative Process

Construction of a model or a domain representation may be a collaborative process. This collaboration may take place within an organization or outside of it, e.g., on the internet.

The process consisting of building a model representation can be done through either a bottom-up or top-down approach:
   someone may start with its view on the model or part of the model, then someone else adds its own Variant and then a general definition is defined;
   one of the stakeholders, or anybody interested, defines a general definition and then Variants are defined by/for each stakeholders of the model or part of the model.

D. Creating, Sharing and Reusing Knowledge

Figure 13:
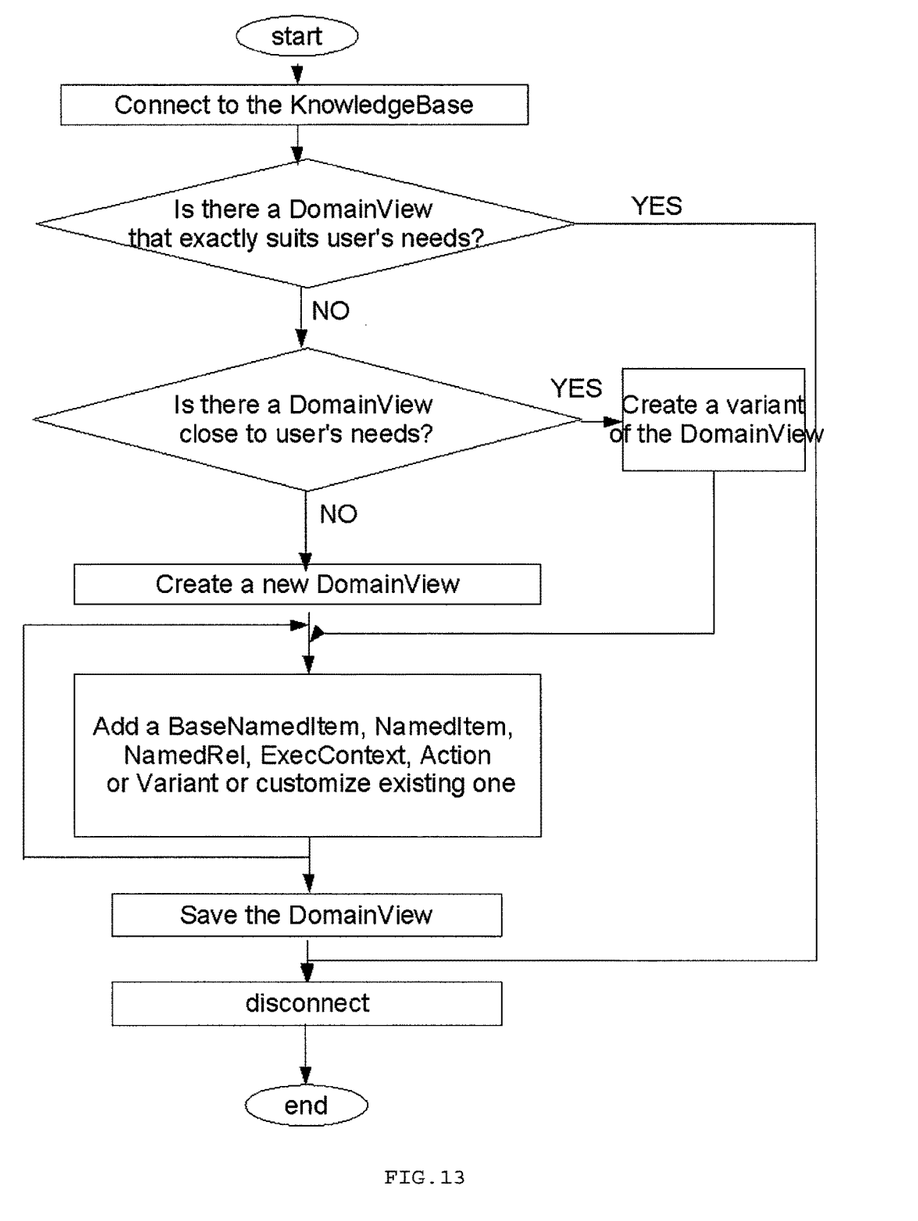
FIG. 13 is a flowchart of an embodiment of a general usage flow.

The general process of using the KnowledgeBase is described in FIG. 13. The user connects to the KnowledgeBase. If there are existing DomainViews, he looks for a DomainView that may suit his needs. If he finds one that needs some customization he makes a variant of the DomainView. A variant is actually a new DomainView that keeps references to the original DomainView and its elements. The user is then able to customize the elements of the DomainView. If there is no DomainView for his needs, then he creates a new one.

Customizing an existing or a new DomainView implies creating BaseNamedItems, NamedItems, NamedRel, ExecContexts, Actions, Variants on those elements, or customizing existing Variants.

E. Information System from DomainViews

Several DomainViews can be defined in a KnowledgeBase. From each DomainView one can derive an information system specific to some usage (or interpret this DomainView in a generic information system.)

The definition of communication between information systems built from or interpreting DomainViews from a model can then be partially or fully automated as they share part of the data structures or part of the steps of an Action. Therefore the cost of communication protocol definition is reduced.

F. Implementation and Deployment

The system and method are suitable for an implementation in an electronic device or in computer hardware.

The system and method can be implemented in a firmware, such as an operating system, or a computer program.

The system and method may also be implemented in a combination of the above possibilities, with some features of the invention incorporated in the firmware, and/or other features possibly included in the hardware and/or some others possibly included in one or several computer programs.

The system and method can be implemented as a computer program product, a computer program digitally stored on a machine-readable device and/or transmitted as a part of a digital signal transmitted or received through a dedicated electronic device, to steer, or for the execution by, a data processing apparatus for data handling.

The system and method can be implemented as a plurality of computer program products interacting to achieve the desirable results.

A computer program practicing the invention can be written in any kind of programming language, including procedural languages, object-oriented languages, script languages, interpreted, compiled languages. It can be implemented as a service, procedure, subroutine, component, module, widget, independent executable program, or any kind of software assembly, or as any combination of those items. A computer program can be stored in one or several electronic storage media and executed on one or several electronic devices, interconnected through a network.

Method acts can be carried out by one or several programmable processors executing one or several computer programs in order to handle input data, perform function features of the invention and produce output.

Method acts can be implemented as a logic circuitry.

An apparatus can be implemented as a logic circuitry.

Processors appropriate for the computer program execution include, as examples, general and special purpose microprocessors, and any one or more processors of any kind of digital computer or quantum computer.

Interaction with the user may take place through a display or projection device for showing or displaying information to the user, auditive information, a keyboard, a pointing device like a mouse or a trackball. Other types of devices can be used such as a device with tactile, speech, acoustic or audio perception and communication ability, device with visual, or movement detection ability.

The system and method can be implemented in a computing system with one or several of the following components: a database for storing data, a data server providing access to data, a user interface providing a graphical, or other means for human interaction, an internet interface providing the access to the features of the invention through a internet browsing tool, an application server. Those components can be integrated as elements or main components in a multi-tier software architecture. Those components can communicate through any type of communication system, including, for example, direct programming interface, software middleware, enterprise software bus, including communication networks like local area network, wide area network or the internet.

The computing system can follow a client server approach. Client and server are usually on separate machines and communicate through a communication network.

The system and method have been described in terms of some particular embodiments. Other suitable embodiments are covered by the claims. For example, the acts can be performed in a different order for still achieving desirable results.

TABLE 1

| Car Variant | Car Owner | Insur. Co | Car Dealer | Constructor |
| --- | --- | --- | --- | --- |
| Constructor | X | X | — | — |
| Type | X | X | X | X |
| Horsepower | X | X | X | X |
| PlateNumber | X | X | X | |
| Price | X | X | X | |
| Owner | — | X | X | |
| ConstructionDate | | | | X |
| ProductionPrice | | | | X |
| DistributionPrice | | | X | X |
| BuyDate | X | | | |
| LastServiceDate | X | | X | |
| Gear | X | | X | X |
| Tires | X | | X | X |
| Parts | | | | X |

What is claimed is:

1. A method for digitally modeling knowledge, comprising:
providing a plurality of modeling cells based on fractal-like structure, each having cell properties including:
an identifier,
relations between a number of modeling cells,
execution context for the execution of an action for modeling situations or circumstances of actions,
is defined as data or metadata, and
contains variations of modeling cells comprising variants and/or extensions and/or aggregations and/or removal of said modeling cells properties;
(1) using a processor to automatically define a plurality of seed modeling cells, and storing said seed modeling cells in a computer datastore;
(2) using a processor to automatically define a first plurality of modeling cells as variations, and storing, via a second processor, said first plurality of modeling cells in a first plurality of other computer datastores, wherein at least one of the modeling cells in the first plurality of modeling cells uses a property or a characteristic to respectively change the at least one of the modeling cells in the first plurality of modeling cells one of from data to metadata or from metadata to data;
(3) using a processor to automatically define a second plurality of modeling cells variations and storing, via a third processor, said second plurality of modeling cells in a second plurality of other computer datastores, wherein at least one of the modeling cells uses the property or the characteristic to respectively change the at least one of the modeling cells in the second plurality of modeling cells one from data to metadata or from metadata to data; and
(4) repeating the step (3) as necessary.

2. The method of claim 1, further comprising the act of selecting a set of modeling cells and seed modeling cells to produce a coherent domain representation.

3. The method of claim 2, wherein multiple users create a plurality of domain representations based on a plurality of shared and/or not shared modeling cells.

4. A method for digitally modeling knowledge, involving multiple users having processors that are in data communication via a network or the internet, the method comprising:
providing a plurality of modeling cells based on fractal-like structure, each having cell properties including:
an identifier,
relations between a number of modeling cells,
execution context for the execution of an action for modeling situations or circumstances of actions,
is defined as data or metadata, and
contains variations of modeling cells comprising variants and/or extensions and/or aggregations and/or removal of said modeling cells properties;
(1) using a processor to automatically define a plurality of seed modeling cells, and storing said seed modeling cells in a computer datastore;
(2) using a processor to automatically define a first plurality of modeling cells as variations and storing via a second processor, in a first plurality of other datastores, wherein at least one of the modeling cells in the first plurality of modeling cells uses a property or a characteristic to respectively change the at least one of the modeling cells in the first plurality of modeling cells one from data to metadata or from metadata to data;

(3) using a processor to automatically define a second plurality of modeling cells as variations of the modeling cells of step (2), and storing, via a third processor, in a second of other datastores, wherein at least one of the modeling cells in the second plurality of modeling cells uses the property or the characteristic to respectively change the at least one of the modeling cells in the second plurality of modeling cells one from data to metadata or from metadata to data; and (4) repeating act (3) via one or more respective additional processors as necessary.

5. The method of claim 4, further comprising the act of selecting a set of modeling cells or seed modeling cells to produce a coherent domain representation.

6. The method of claim 5, further comprising providing said domain representation in an executable artifact or creating an executable artifact based on said domain representation.

7. The method of claim 4, wherein the modeling cells and all or part of their functionality are implemented as add-ons, plug-ins, widgets in, and/or as a service accessible through, an internet interfacing device.

8. The method of claim 4, wherein the first processor, second processor, third processor, and the one or more respective additional processors are the same processor.

9. A knowledge management tool operating in a computing system having a processor, the knowledge management tool comprising:
a data module using said processor for automatically storing, modeling cells based on fractal-like structure, each having cell properties including:
an identifier,
relations between a number of modeling cells,
execution context for the execution of an action for modeling situations or circumstances of actions,
is defined as data or metadata, and
contains variations of modeling cells comprising variants and/or extensions and/or aggregations and/or removal of said modeling cells properties;
an edition module using said processor for automatically creating and editing modeling cells, stored in said data module, said edition module providing means to create new modeling cells with a variation of modeling cell, wherein at least one of the new modeling cells uses the characteristic or the property to respectively change the at least one of the new modeling cells one from data to metadata and from metadata to data.

10. The knowledge management tool of claim 9, wherein said edition module is linked to other data modules available locally or through a network or the internet, said edition module displaying modeling cells defined in said linked data modules.

11. The knowledge management tool of claim 9, wherein said modeling cells are implemented in a computer program product or a computer executable artifact as one or several classes in an object-oriented language.

12. The knowledge management tool of claim 9, wherein the functionality of said data module and said edition module is implemented in one or several computer programs or computer executable artifacts accessed and executed through the computing system comprising an internet interfacing device.

* * * * *